US008335747B1

(12) United States Patent
Roberts (10) Patent No.: US 8,335,747 B1
(45) Date of Patent: Dec. 18, 2012

(54) CLIENT-SERVER REAL ESTATE VALUATION SYSTEM

(76) Inventor: William Andrew Roberts, Wellesley, MA (US)

( * ) Notice: Subject to any disclaimer, the term of this patent is extended or adjusted under 35 U.S.C. 154(b) by 241 days.

(21) Appl. No.: 12/491,732

(22) Filed: Jun. 25, 2009

(51) Int. Cl.
*G06Q 50/00* (2012.01)
(52) U.S. Cl. ........................................ 705/313; 705/306
(58) Field of Classification Search .................. 705/313, 705/306
See application file for complete search history.

(56) References Cited

U.S. PATENT DOCUMENTS

| 2002/0188541 | A1* | 12/2002 | Josko et al. ...................... 705/36 |
| 2003/0212565 | A1* | 11/2003 | Badali et al. ....................... 705/1 |
| 2007/0106523 | A1* | 5/2007 | Eaton et al. ........................ 705/1 |
| 2007/0198278 | A1* | 8/2007 | Cheng et al. ....................... 705/1 |
| 2008/0082344 | A1* | 4/2008 | Parker ............................... 705/1 |
| 2008/0120216 | A1* | 5/2008 | Saigh et al. .................. 705/36 R |
| 2008/0201247 | A1* | 8/2008 | Bradford ......................... 705/35 |

OTHER PUBLICATIONS

O'Rourke, Ann, "Automated Valuation Models—Threat and Opportunity," Appraisal Today, <http://www.appraisaltoday.com/avms.htm>,Sep. 1998, pp. 1-6.
Corey, DR., "Ask The Appraiser," <http://www.sunonline.com/Repository/ml.asp?Ref=U0...QXIxMDgwMA ==&Mode=HTML &Locale=english-skin-custom>,Charlotte Sun Publication, Sep. 30, 2006, pp. 1-3.
Fonda, Laura, "What Is Meaning of Restricted Use Appraisal in Real Estate?," eHow, Inc. <http://www.ehow.com/facts_6139689_meaning-use-appraisal-real-estate_.html>, Apr. 2, 2010, pp. 1-2.
Halko, Kenneth J., "Services," Halko & Company Real Estate Appraisers, <http://web.archive.org/web/20080511040727/www.halko.com/real-estate-appraisal-services>, Jun. 9, 2008, pp. 1-2.
"Welcome to Online Appraisal Team!," Online Appraisal Team, <http://www.onlineappraisalteam.com>, Feb. 28, 2010, pp. 1-2.
"Exterior-Only Inspection Residential Appraisal Report," Freddie Mac Form 2055, Mar. 2005, pp. 1-6.
"Quality Control Best Practices," Freddie Mac, <http://www.freddiemac.com/singlefamily/quality_control.html>, Oct. 2011, pp. 1-37.

\* cited by examiner

*Primary Examiner* — Jami A Plucinski
*Assistant Examiner* — Vern Cumarasegaran
(74) *Attorney, Agent, or Firm* — Cesari and McKenna, LLP; Michael R. Reinemann (57) ABSTRACT

A client-server architecture provides appraisal services between licensed appraisers and customers. The server includes an appraiser database having a plurality of records, and a query engine for searching the database. Each record corresponds to a licensed appraiser, and includes contact information and information regarding one or more locations in which the appraiser has expertise. An appraiser-client is accessible to the server through contact information stored in the appraiser database. The server includes a web hosting module that interfaces with the query engine. A customer-client communicates with the server, and orders a valuation of a residence. Videos, photos and architectural plans may be attached to the order. The query engine searches the appraiser database for an appraiser-client whose location information matches the address of the residence. The server utilizes the contact information to forward the order to the appraiser client whose location information matched the address of the residence.

8 Claims, 9 Drawing Sheets

| APPRAISER NAME | LICENSE INFORMATION | LOCATION 1 | | LOCATION 2 | | LOCATION 3 | PRIMARY CONTACT INFORMATION | SECONDARY CONTACT INFORMATION |
|---|---|---|---|---|---|---|---|---|
| | | ZIPCODE | CITY/TOWN | ZIPCODE | CITY/TOWN | | | |
| JOHN DOE | MA - #1234 | 02492 | NEEDHAM | 02026 | DEDHAM | NORFOLK COUNTY | john.doe@email.com | 123-258-6544 |
| JOHN DOE | RI - #9876 | 02903 | PROVIDENCE | 02860 | PAWTUCKET | PROVIDENCE COUNTY | jdoe@email.com | 555-456-1234 |
| BILL STEVENS | MA - #5555 | 02631 | BREWSTER | 02645 | HARWICH | CAPE COD | 800-999-5555 | bstevens@email.com |
| | | | | | | | | |
| | | | | | | | | |
| | | | | | | | | |
| | | | | | | | | |

FIG. 5

VALUE CHECK ORDER ENTRY

602 ADDRESS
STREET:
CITY/TOWN: STATE:
ZIP CODE: REGION:

604 ATTACHMENTS
ATTACHED FILES:
- New_Kitchen.JPEG
- House_Tour.WMV
- Pool.JPEG

ADD
DELETE

606 COMMENTS:
new, energy efficient windows throughout

608 CONTACT
NAME:
EMAIL:
PHONE:

610 PAYMENT
CREDIT CARD NO.:
CREDIT CARD TYPE:
EXP.

SUBMIT
CANCEL

FIG. 6

┌─────────────────────────────────────────────────────────────────────┐
│  ┌──────────────┐ ─702                                          ─330│
│  │ Today's date │                                                   │
│  └──────────────┘                                                   │
│  ┌─────────────────┐ ─704                                           │
│  │ Customer name   │                                                │
│  │ Customer address│                                                │
│  └─────────────────┘                                                │
│        ┌──────────────────────────────────────────────┐ ─706        │
│        │ RE:  123 Main Street, Hometown, Home State   │             │
│        └──────────────────────────────────────────────┘             │
│  ┌────────────────┐ ─708                                            │
│  │ Dear Customer: │                                             710 │
│  └────────────────┘                                                 │
│  ┌─────────────────────────────────────────────────────────────────┐│
│  │ As requested, I have researched and evaluated the property     ││
│  │ listed within your order for the purpose of determining current││
│  │ market value. This evaluation was completed without the benefit││
│  │ of a ride-by or interior inspection. The information used to   ││
│  │ reach the current market value was acquired via the Multiple   ││
│  │ Listing Service (MLS), private transaction sources, such as    ││
│  │ Banker & Tradesman, and public records. Please Note: average   ││
│  │ condition was assumed unless the MLS sheets were available for ││
│  │ the property.                                                  ││
│  └─────────────────────────────────────────────────────────────────┘│
│  ┌──────────────────────────────────────────────────┐               │
│  │ The value estimate/opinion is as follows:        │ ─712          │
│  │   ▶ 123 Main Street, Hometown, Home State        │               │
│  │   ▶ Approximately: $225,000                      │           714 │
│  └──────────────────────────────────────────────────┘               │
│  ┌─────────────────────────────────────────────────────────────────┐│
│  │ Further clarification/explanation would require additional     ││
│  │ investigation including but not limited to a ride-by and/or    ││
│  │ interior inspection with a follow up appraisal report.         ││
│  └─────────────────────────────────────────────────────────────────┘│
│  ┌────────────────────────────────────────────────────────┐ ─716    │
│  │ Please feel free to contact me at 123-456-7890 or      │         │
│  │ jdoe@email.com                                         │         │
│  └────────────────────────────────────────────────────────┘         │
│  ┌────────────┐ ─718                                                │
│  │ Sincerely, │                                                     │
│  └────────────┘                                                     │
│  ┌────────────────┐ ─720                                            │
│  │ Appraiser name │                                                 │
│  └────────────────┘                                                 │
│  ┌──────────────────────────────────────────┐                       │
│  │ Attachments:  Copy of Appraiser License  │                       │
│  │               Certifications             │ ─722                  │
│  │               Real Estate Broker License │                       │
│  │               Resume                     │                       │
│  └──────────────────────────────────────────┘                       │
└─────────────────────────────────────────────────────────────────────┘

FIG. 7

CLIENT-SERVER REAL ESTATE VALUATION SYSTEM

BACKGROUND OF THE INVENTION

1. Field of the Invention

The present invention relates to client-server based computer architectures and, more specifically, to an electronic client-server system configured to facilitate the generation of real estate values in an efficient manner.

2. Background Information

Mortgage lenders make loans to individuals based on several criteria including a valuation of the residential real property, such as a home or residence, that is securing the loan. An appraisal is often performed on behalf of the lender to determine an appraised value of the property. The appraisal is typically performed by a licensed or otherwise legally certified appraiser. The appraiser is typically licensed or certified within his or her state and/or locality. Appraisers may also be licensed or certified through various certifying entities on a national or regional basis.

The appraiser conducts an inspection of the condition of the interior and exterior of the property, and may measure each room or the foundation to determine an approximate square footage of the property. The appraiser also may take photographs of the exterior and interior of the property. The appraiser also reviews several comparable properties in order to select those that form an appropriate basis for comparison to the property being appraised. The appraiser typically uses the completed sales prices of comparable properties that have recently sold to help determine a value for the subject property. The appraiser also may consider the period of time that has elapsed between the sale of the comparable properties and the current date in adjusting the sales prices of the comparable properties to determine a value of the subject property. The appraiser may gather information on the city or town in which the property is located, and review the deed for the property. The appraiser will then prepare a detailed report for the lender including the home's appraised value. This detailed report and the process by which it is created is known as a "full" appraisal.

In some circumstances, an appraiser may be asked to perform what is known as a "drive-by" appraisal. A "drive by" appraisal is similar to the "full" appraisal described above except that, in the "drive by" appraisal, the appraiser does not conduct an interior inspection of the subject property. A drive-by appraisal can be utilized in a variety of situations, such as where the credit or other risks attendant to the loan are less, and thus the need for a high-level of accuracy in the valuation process is reduced. In general, a drive-by appraisal takes significantly less time to complete and costs considerably less than a full appraisal.

More recently, automated valuation systems have been developed. These automated systems typically use proprietary computer-based models or algorithms to match a subject property to several properties stored in a database that are deemed by the model or algorithm to be comparable. These systems may be accessible through websites, such as www.zillow.com and www.electronicappraiser.com, among others. These systems are typically referred to as Automated Valuation Models (AVMs). While such automated systems have become increasingly popular, presumably due to their low cost, the "values" they return have been criticized as inaccurate.

SUMMARY OF THE INVENTION

Briefly, the invention relates to a client-server architecture for use in facilitating the creation of accurate residential real estate values in a cost efficient manner. Specifically, a server maintains an appraiser database having a plurality of records, and a query engine for searching the database. Each record of the appraiser database corresponds to a licensed appraiser and includes contact information and information regarding one or more locations in which the respective appraiser has expertise, e.g., local knowledge. Associated with each appraiser is at least one appraiser-client that is accessible to the server through the contact information stored in the appraiser database. The server further includes a web hosting module that interfaces with the query engine. A customer, through a customer-client that is also in communicating relationship with the server, may order a ValueCheck appraisal of a residence. As described herein, a ValueCheck appraisal or valuation report represents a novel form of an appraisal. While not constituting a full appraisal, the ValueCheck appraisal is nonetheless prepared and signed by a licensed appraiser who has direct, relevant knowledge of the area in which the home is located, and who uses his or her professional judgment and expertise in preparing the ValueCheck appraisal. It thus represents a far more accurate valuation than those produced by the Automated Valuation Models (AVMs) and yet, as described herein, can be produced efficiently and economically.

The customer-client may access one or more web pages managed by the web hosting module of the server. The customer specifies the address of the residence. The query engine receives the order, and searches the appraiser database for at least one appraiser whose location information matches the address of the residence. Utilizing the contact information for the at least one appraiser, the server issues an appraisal request to the appraiser-client corresponding to the at least one appraiser whose location information matched the address of the residence.

The request is received at the appraiser-client and, in response to the request, the appraiser remotely generates a ValueCheck appraisal, e.g., an opinion of value, for the residence. In particular, the appraiser does not visit or otherwise inspect the residence. Instead, the appraiser generates the value estimate using his or her expertise and knowledge of the local area, and on readily accessible information. The remotely generated value estimate may be signed by the appraiser, and may include certification or license information and qualification information, such as a resume, of the appraiser. The appraiser operating through the appraiser-client may access the server, and post the remotely generated value estimate on the server. The customer operating through the customer-client may access and download the remotely generated value estimate.

In an embodiment, the web hosting module is configured to receive additional information beyond the address of the residence from the customer-client. In particular, the web hosting module may receive one or more files regarding the residence from the customer, such as video, image or text-based files. The files may be attached to the order by the customer. This additional information is also provided to the at least one matching appraiser and may be utilized, according to his or her professional judgment, in generating the value estimate.

In another embodiment, rather than post the value estimate at the server, the appraiser, through the appraiser-client, may transmit the value estimate directly to the customer-client.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
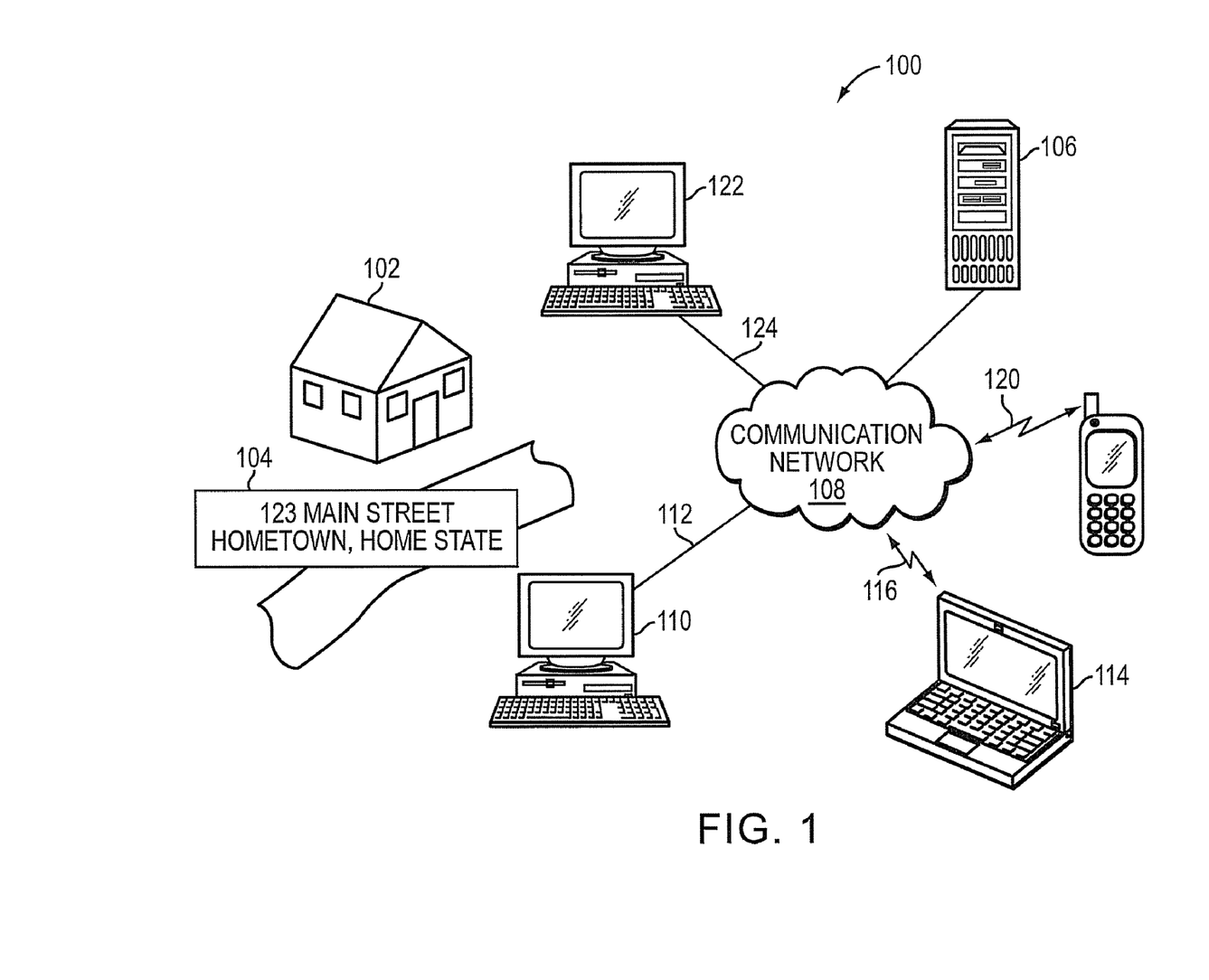
FIG. 1 is a highly schematic illustration of an environment in accordance with an embodiment of the present invention.

FIG. 1 is a schematic illustration of an environment 100 in which the present invention may be utilized. The environment 100 may include a home 102 or other residential real estate having an address 104, e.g., 123 Main Street, Hometown, Home State. The environment 100 further includes a valuation server 106 that may be coupled to a communication network 108, such as the Internet. Also coupled to the communication network 108 may be a plurality of data processing devices that are associated with customers, such as homeowners, real estate brokers, prospective buyers, etc. Other data processing devices are associated with licensed appraisers, and are coupled to the communication network 108. Specifically, a first laptop computer 110, which may be utilized by a first licensed appraiser, may be coupled to the communication network 108, e.g., through a wired link 112. A second laptop computer 114, which may be utilized by a second licensed appraiser, may be coupled to the communication network 108, e.g., through a wireless connection, designated generally by 116. A smart phone or personal digital assistant (PDA) 118, which may be utilized by a third licensed appraiser, may be coupled to the communication network 108, e.g., through a wireless connection, designated generally by 120. A third laptop 122, which may be associated with a customer, such as the owner of the home 102, may be coupled to the communication network 108, e.g., through a wired link 124.

It should be understood that the communication network 108 may include or be connected to other networks, such as cellular telephone networks, the public switched telephone system, private networks, satellite-based networks, etc.

As described herein, the electronic server 106 provides services to the data processing devices, i.e., electronic clients. It should be understood that other, possibly far more complex, network designs may be implemented.

Figure 2:
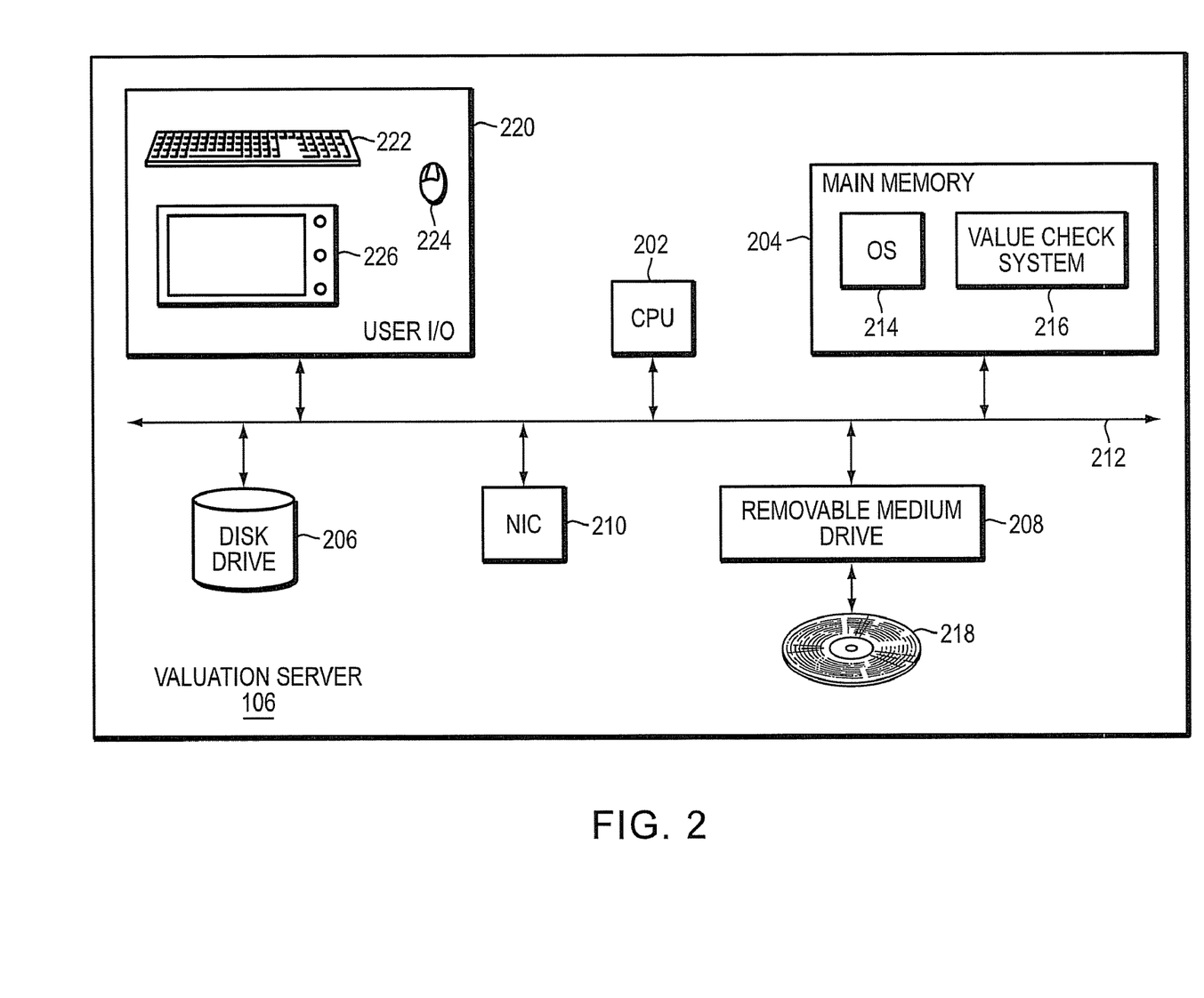
FIG. 2 is a schematic illustration of a server in accordance with an embodiment of the present invention.

FIG. 2 a schematic hardware illustration of the valuation server 106. The valuation server 106 may include a central processing unit (CPU) 202, a main memory 204, a disk drive 206, a removable medium drive 208, and one or more network interface cards (NICs) 210 that are interconnected by a system bus 212. The main memory 204 may store a plurality of programs, libraries or modules, such as an operating system 214, and one or more applications running on top of the operating system 122, including a value check system 216. The removable medium drive 208 is configured to accept and read a computer readable medium 218, such as a CD, DVD, floppy disk, solid state drive, tape, flash memory or other medium. The removable medium drive 208 may further be configured to write to the computer readable medium 218.

The valuation server 106 also may include and/or be accessible by a device having a user input/output (I/O) 220. The user I/O 220 may include a keyboard 222, a mouse 224 and a display 226. It should be understood that other or additional user I/O may be provided, such as a touch screen, a touch pad, etc.

Suitable servers include the ProLiant and Integrity series of servers from Hewlett Packard Co. of Palo Alto, Calif., and the PowerEdge series of servers from Dell Inc. of Round Rock, Tex., among others.

Suitable processors may include single processor architectures, dual or quad core processor architectures, microprocessors, etc., or various combinations thereof.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating system, among others.

Nonetheless, those skilled in the art will understand that the valuation server 106 of FIG. 2 is meant for illustrative purposes only and that the present invention may be used with other computer systems, processing systems or computational devices.

It should be understood that the clients 110, 114, 118 and 122 of FIG. 1 may include similar hardware components as illustrated in FIG. 2 for the valuation server 106. Suitable client devices include personal computers (PCs), workstations, laptops, palm computers and other portable computing devices, smart phones, electronic readers (e-readers) etc.

Figure 3:
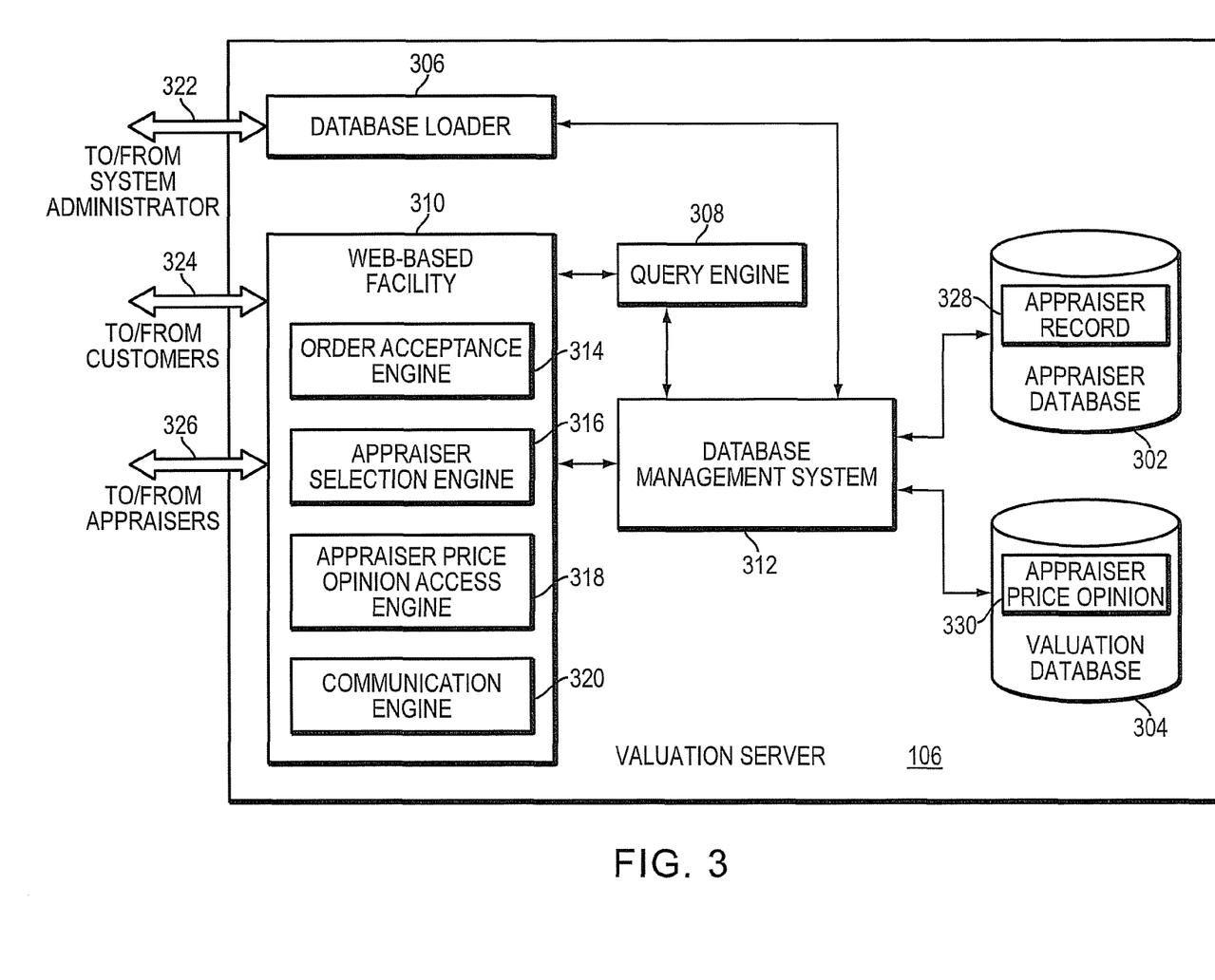
FIG. 3 is a functional block diagram of a server in accordance with an embodiment of the present invention.

FIG. 3 is a schematic, functional illustration of the valuation server 106. The valuation server 106 may include one or more databases, such as an appraiser database 302 and a valuation database 304. The valuation server 106 may also include a database loader 306, a query engine 308 and a web-based facility 310 that each may be coupled to the databases 302, 304 via a database management system (DBMS) 312. The web-based facility 310 may include a plurality of components, such as an order acceptance engine 314, an appraiser selection engine 316, a value check access engine 318, and a communication engine 320. A system administrator may access the database loader 306 to manipulate the contents of the appraiser database 302 and/or the valuation database 304, as illustrated by arrow 322. One or more customer-clients may access the web-based facility 310, as indicated by arrow 324, and one or more appraiser-clients may access the web-based facility 310, as indicated by arrow 326.

The appraiser database 302 may be configured to store information regarding a plurality of appraisers, such as licensed appraisers. This information may be stored in terms of records, such as an appraiser record 328. The value check database 304 may be configured to store value information, such as valuation reports or opinions of value, as indicated by valuation report 330.

It should be understood that the functionality of the valuation server 106 may be implemented in other ways. For example, the functionality may be distributed and/or duplicated across a plurality of servers, such as in a server farm arrangement.

Figure 4A:
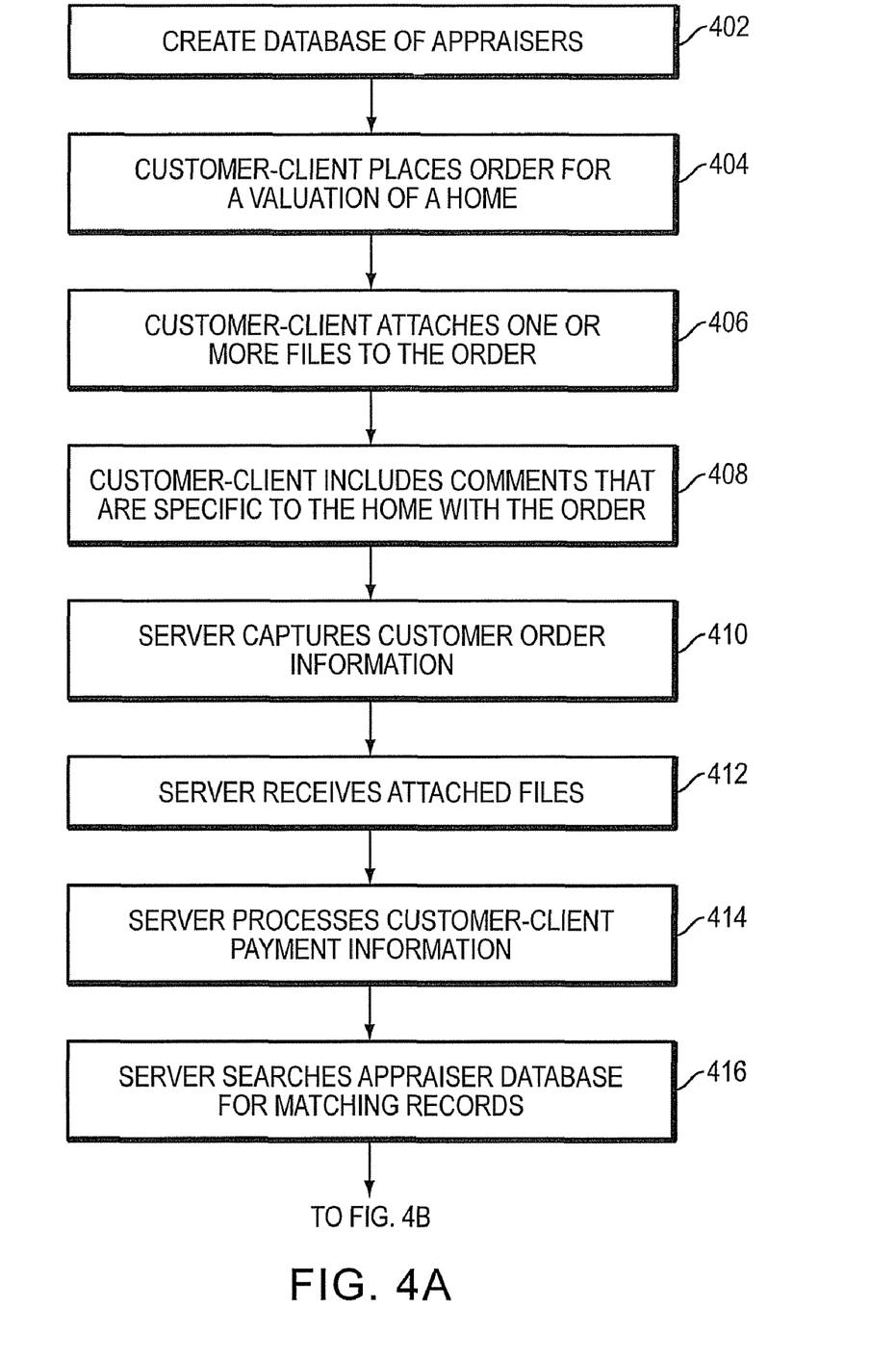
FIGS. 4A-C are a flow diagram of a method in accordance with an embodiment of the present invention.
Figure 4B:
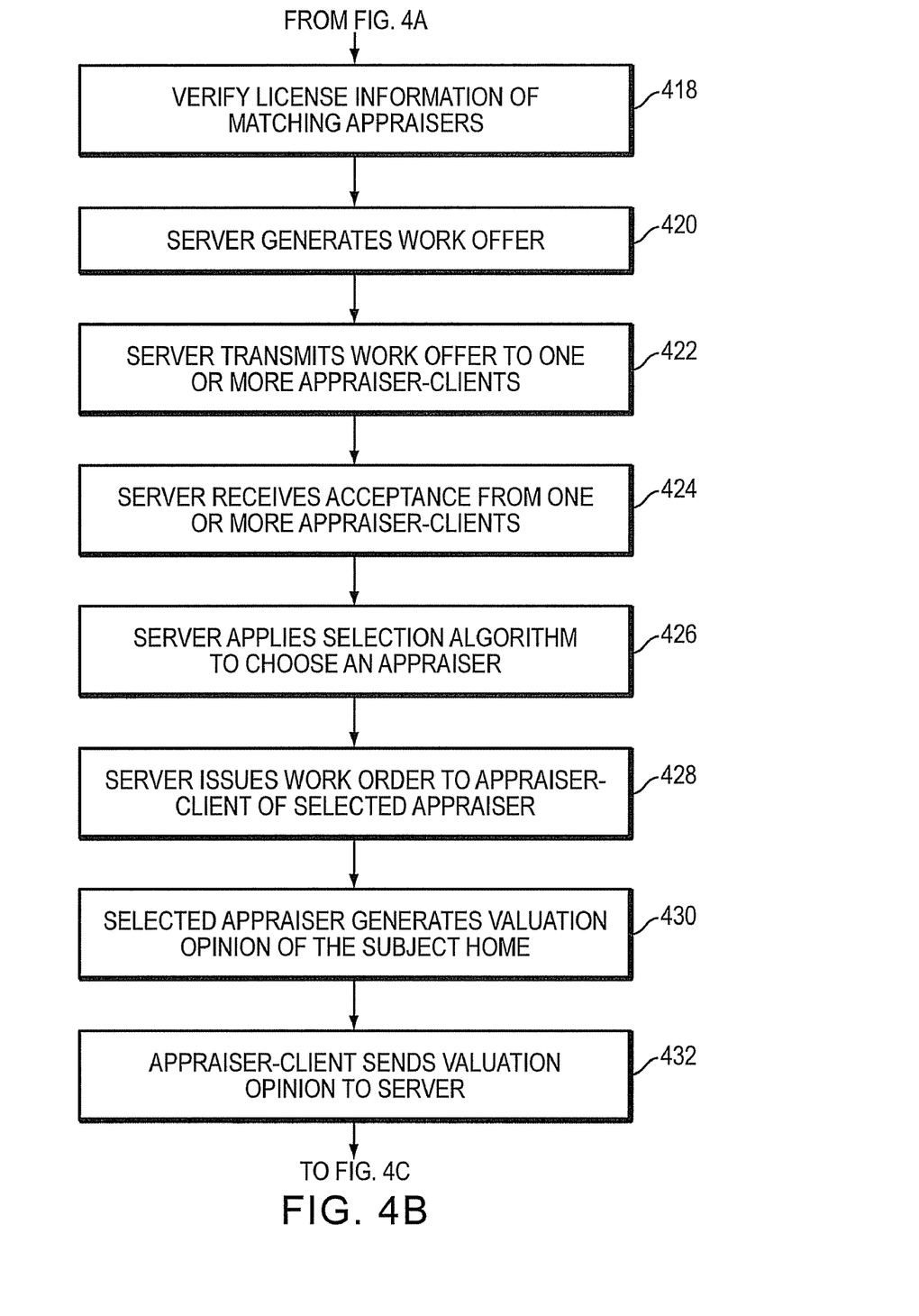
Figure 4C:
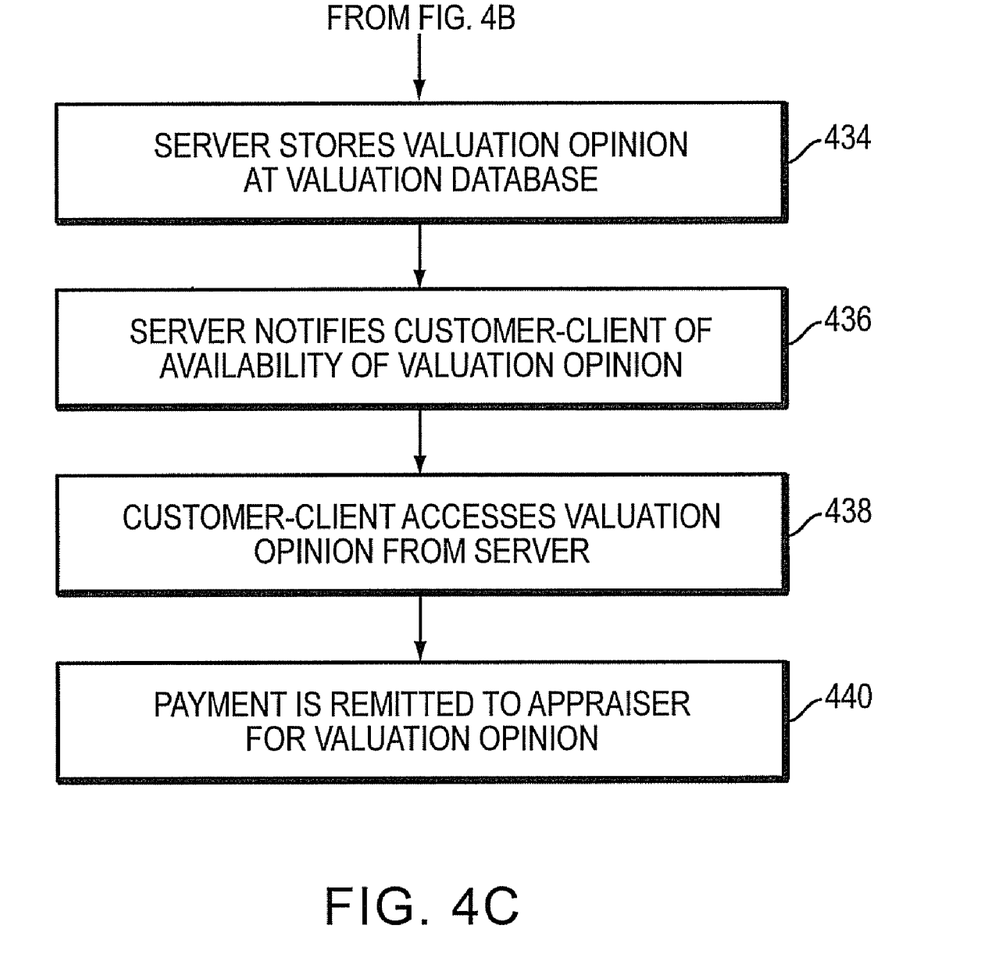
Figure 5:
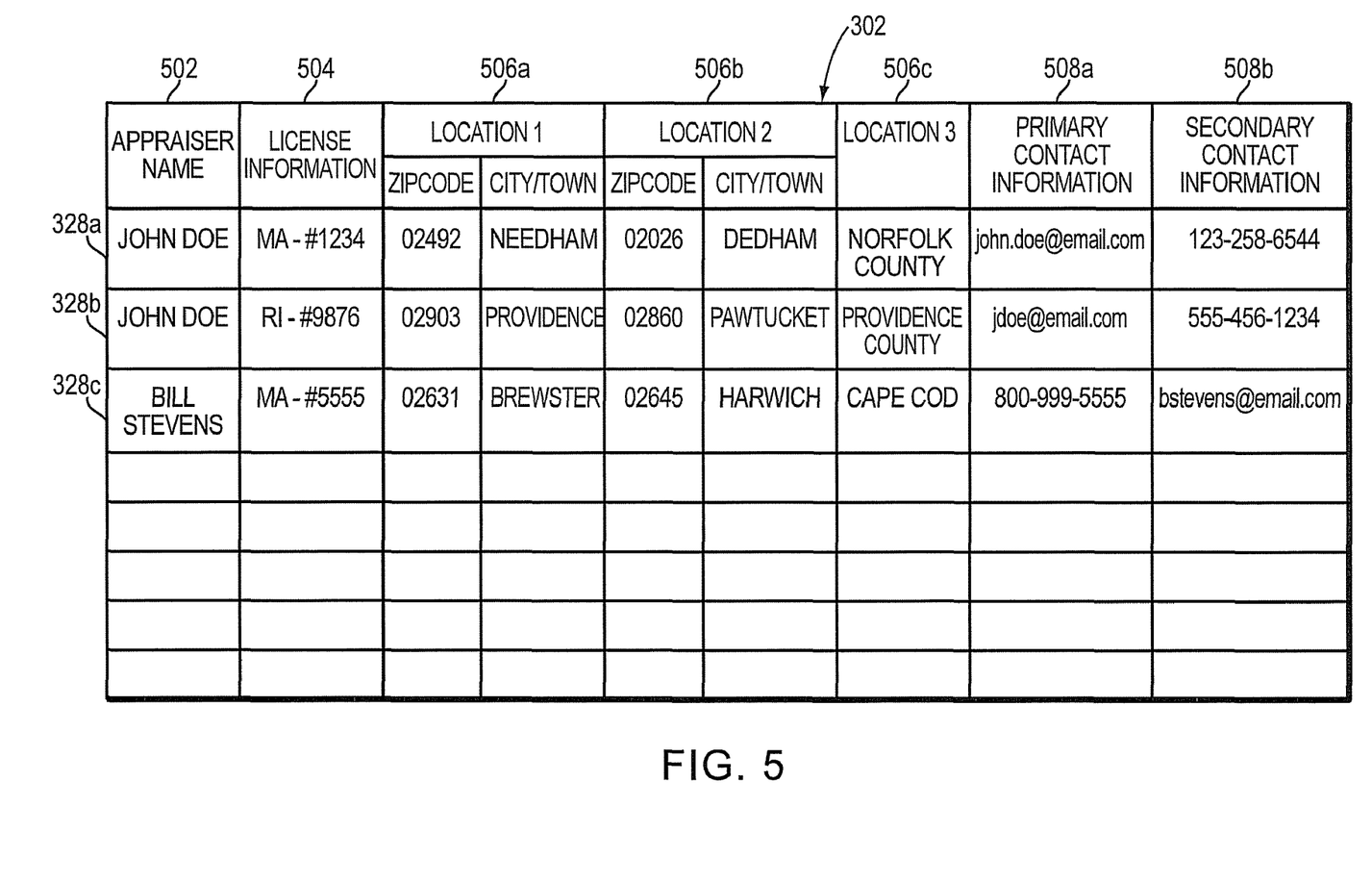
FIG. 5 is a schematic illustration of a data structure in accordance with an embodiment of the present invention.

FIGS. 4A-C are a flow diagram of a method in accordance with an embodiment of the present invention. A system administrator may build a database of appraisers, as indicated at block 402. The information for each appraiser may be stored in one or more respective appraiser records 328. FIG. 5 is a schematic illustration of the appraiser database 302 having a plurality of appraiser records, such as records 328a-c. The appraiser database 302 may be organized as a table or array having a plurality of columns and rows whose intersections define cells for storing data or information. Each row moreover may correspond to an appraiser record 328. Specifically, the appraiser database 302 may include an Appraiser Name column 502, a License information column 504, one or more Location columns, such as Location columns 506*a-c*, and one or more contact columns, such as a Primary Contact Information column 508*a* and a Secondary Contact Information column 508*b*.

It should be understood that the appraiser database 302 may include additional or other information.

In an embodiment, licensed appraisers may contact the system administrator and request inclusion in the appraiser database 302. If an appraiser is selected for inclusion, the system administrator may create one or more records 328 corresponding to that appraiser in the appraiser database 302. In the Appraiser Name cell of the one or more records, the system administrator may enter the appraiser's name, e.g., John Doe. In the License Information cell of the respective record, the system administrator may enter information regarding the appraiser's license credentials, such as the governmental entity, e.g., the state, or licensing body, that issued the license, e.g., Massachusetts (MA), the license number that was granted or assigned to the appraiser, expiration and/or renewal dates, etc. In the Location cells of the respective record, the system administrator may enter information specifying the areas or locations in which the respective appraiser has expertise. For example, the system administrator may enter zip codes and the names of cities or towns, counties, townships, regions, areas, states or other location descriptors. The particular locations listed in the Location cells for a given appraiser specify those areas in which the appraiser has experience. As shown, Location columns 506*a* and 506*b* may include both zip code and city/town name information, while Location column 506*c* includes county or region name information.

The designation of locations for inclusion in the one or more records created for an appraiser may be received from the appraiser. That is, the appraiser may provide a list of locations to the system administrator. In an embodiment, the locations associated with an appraiser are based on prior appraisal work by the appraiser in those locations. The system administrator may confirm or verify that the appraiser has indeed performed appraisals within the specified location in some relevant time period, e.g., during the last five years. For example, an appraiser may be required to submit copies of one or more appraisals that the appraiser performed in each of the locations being identified.

In the Contact Information cells of the respective record 328, the system administrator may enter information for use in contacting the appraiser-client, such as telephone numbers, e.g., cellular (cell) or mobile telephone numbers, office telephone numbers, home telephone numbers, electronic mail (email) addresses, pager numbers, etc. As indicated in FIG. 5, this information may be organized in terms of contacting preference. More specifically, for an appraiser that prefers to be contacted by email, an email address may be listed in the Primary Contact cell. For an appraiser that prefers to be contacted by phone, a telephone number may be listed in the Primary Contact cell.

It should be understood that the appraiser database 302 may take other forms and may include additional and/or other information. For example, in an embodiment, the appraiser database may only include zip codes (or city or town names) as the location information. In another embodiment, the appraiser database may include feedback on appraisers from customers, such as a rating from 1 to 5 stars for timeliness and quality of the appraiser's work product. The appraiser database may also include written comments from customers regarding the respective appraisers. The appraiser database may also include qualifications, such as membership or certifications from standards groups or bodies.

The appraiser database 302 (FIG. 3) thus may be populated with many, e.g., hundreds, thousands or more, appraisers whose locations of experience or expertise may cover an entire state, region or country.

In an embodiment, appraisers may be periodically, e.g., annually, charged a subscription fee by the entity operating or managing the valuation server 106, for inclusion in the appraiser database 302. Alternatively, appraisers may be charged a one-time fee to be included in the appraiser database 302. Those skilled in the art will understand that other financial or payment arrangements may be made.

A customer, such as a homeowner or prospective home buyer, who wants to receive a value check on a piece of residential real property, e.g., his or her home or a home on which he or she may be making an offer to purchase, may access the order acceptance engine 314, and submit an order for an appraiser-signed ValueCheck appraisal, which may also be referred to herein as a valuation report or opinion, of the home, as indicated at block 404. In particular, from a customer-client, such as laptop computer 122 or other electronic data processing device, the customer may utilize a browser application to access a web site hosted by the web-based facility 310. That is, the customer may enter a domain name associated with that web site into the browser application, and thus establish a communication link with the web-based facility 310. In response, the order acceptance engine 314 may present an interactive order webpage to the customer for display on the customer's laptop computer 122.

Figure 6:
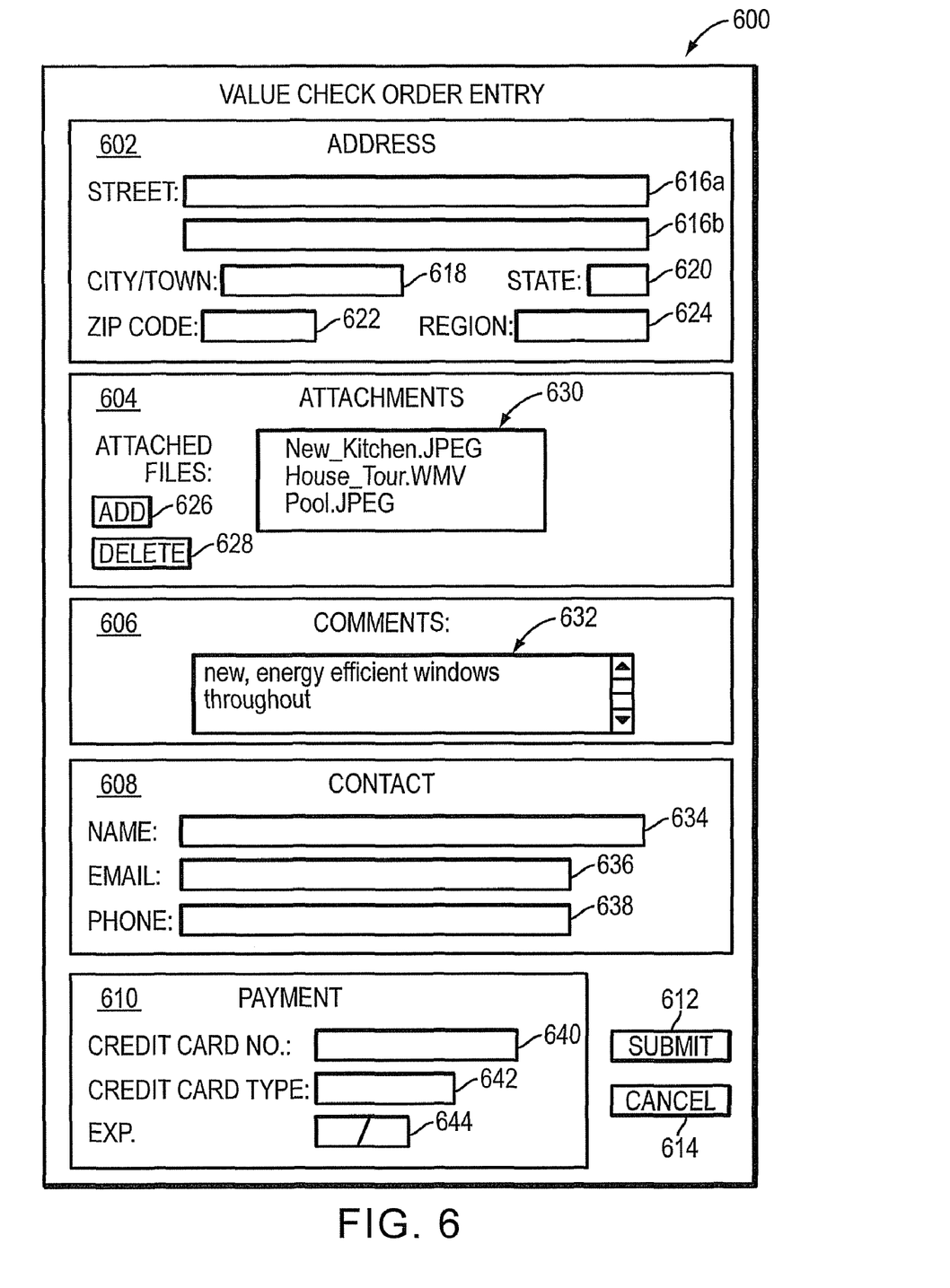
FIG. 6 is a schematic illustration of an order entry user interface.

FIG. 6 is a schematic illustration of an exemplary order entry webpage 600 generated by the order acceptance engine 314 for presentation to the customer, e.g., on the display of the laptop computer 122. The order entry webpage 600 may include an Address area 602, an Attachments area 604, a Comments area 606, a customer Contact area 608, and a Payment area 610. It may further include one or more command buttons, such as a Submit command button 612 and a Cancel command button 614. The Address area 602 may include a plurality of fields, such as text boxes, for receiving information from the customer about the home for which a value check is to be conducted or performed. For example, the Address area 602 may include one or more street entry boxes 616*a* and 616*b*, a city/town entry box 618, a state entry box 620, a zip code entry box 622 and a region entry box 624. The customer may enter information into boxes 616-624 to specify the address of the home for which a value check is being requested, e.g., 123 Main Street, Hometown, Home State, which corresponds to the home 102 (FIG. 1).

The Attachments area 604 may include one or more command buttons, such as an Add button 626 and a Delete button 628, and a field 630 that lists the attached files. The Comments area 606 may include a text box 632 for receiving information, e.g., typewritten information, from the customer regarding the home for which the value check is being requested. The Contact area 608 may include a plurality of text boxes for receiving information regarding the person who is ordering the value check of the home. Specifically, the Contact area 608 may include a Name field 634, an Email field 636, and a telephone number field 638. The Payment area 610 may include one or more fields for receiving payment information from the customer. For example, it may include a credit card number box 640, a credit card type box 642 and an expiration (exp.) date box 644.

In addition to entering the street address of the home, e.g., 123 Main Street, Hometown, Home State, in the Address area 602, the customer may also include additional information about the home. Specifically, the customer may attach one or more files to the order, as indicated at block 406. In an embodiment, the attached files may provide additional information about the home for which the value check is being requested. This additional information may not be readily accessible by an appraiser from public sources. For example, the attached files may be architectural or floor plans of additions, expansions, etc., photographs of a new kitchen or bathroom, videos of a walk through the home or grounds, receipts evidencing new windows or a remodeled bathroom, etc. To add the files, the customer may select the Add command button 626. In response, the order acceptance engine 314 may present a Browse dialog box (not shown) that may be operated by the user to navigate to and select a desired file for attachment. The desired file may be stored on the customer's laptop computer 122, or on a removable storage medium. To remove previously added files, the customer may highlight the file to be removed as listed in the filed 630, e.g., with the mouse, and select the Delete command button 628. In response, the order acceptance engine 314 may remove the designated file from the order. The customer also may add one or more comments to the order, as indicated at block 408. Specifically, the customer may enter information, e.g., using the keyboard, into the text box 632 of the Comments area 606. In an embodiment, the customer may include information in the text box 632 that may be helpful to an appraiser in conducting a value check of the home. Exemplary information may include information regarding the installation of energy efficient windows, the installation of a new heating and/or cooling system, a new roof, ocean or mountain views, etc.

In the Contact area 608, the customer enters information for use in contacting him or her. In the Payment area 610, the customer enters information, such as credit or debit card account information, bank account information, etc., for paying for the value check on the home listed in Address area 602.

When the customer has entered the desired information into the order entry webpage 600, he or she may select the Submit command button 612. In response, the order acceptance engine 314 may capture the information entered by the customer in the Address, Comments, Contact and Payment areas 602, 606, 608 and 610, as indicated at block 410. The order acceptance engine 314 also may initiate a transfer of the files listed in field 630, e.g., the picture and video files, to the web-based facility 310 at the valuation server 106, as indicated at block 412. The order acceptance engine 314 also may process the payment information, as indicated at block 414. For example, the order acceptance engine 314 may charge the customer's credit or debit card number.

It should be understood that orders may be made in ways other than through the use of one or more order entry webpages. For example, a customer may place an order by sending an email or a facsimile transmission to the valuation server 106, or by calling a customer service representative who may enter the information described in connection with FIG. 6.

In an embodiment, the order acceptance engine 314 extracts the address information for the home or residence for which a value check is being requested from the customer's order, and provides this information to the query engine 308. The query engine 308, in turn, conducts a search of the appraiser database 302 to identify one or more appraisers whose area of expertise or experience includes the address of the home identified in the order, as indicated at block 416. In an embodiment, the query engine 308 identifies all of the appraisers who have expertise or experience in the area in which the home or residence is located. Specifically, the query engine 308 may retrieve the city or town name and/or zip code information entered by the user in text boxes 618 and 622, and conduct a search for all records 328 of the appraiser database 302 having a location that matches the city or town information entered by the customer for the home to be valued. That is, the query engine 308 may search on the cells of the records 328 that correspond to the location fields 506a-c. For example, suppose that the customer entered "Pawtucket" in the text box 618 for city/town, or "02860" in the text box 622 for zip code. The query engine 308 will identify record 326b as a matching entry.

In an embodiment, the query engine 308 may be configured to identify each appraiser record 328 whose zip code value(s), city or town name(s), and/or region name(s) as contained in the cells of columns 506 is an exact match to the corresponding information entered by the customer in the city/town text box 618, the state text box 620, the zip code text box 622, and/or the region text box 624 of the order entry webpage 600. The query engine 308 may be configured alternatively or additionally to identify appraiser records 328 where the location information is near the address of the home or residence to be valued. For example, the query engine 308 may identify appraiser records where the location information is close, e.g., within five, ten or 50 miles, of the address of the home or residence. A suitable algorithm for determining distances between zip codes, which uses latitude and longitude information, is available from Hexasoft Development of Penang, Malaysia, and is described at www.zipcodeworld.com. It should be understood that this range, e.g., within five, ten or 50 miles, may be may be selectable by the customer in the order entry webpage 600.

The query engine 308 may return each of the identified, e.g., matching, records 328 to the appraiser selection engine 316 of the web-based facility 310. The appraiser selection engine 316 may check that the license information of each of the matching appraisers is current, as indicated at block 418 (FIG. 4B). That is, the appraiser selection engine 316 may check the information contained in the cell corresponding to field 504. If the appraiser's license is out-of-date or expired, the appraiser selection engine 316 may reject that appraiser. The appraiser selection engine 316 may generate a work offer for transmission to each matching appraiser, as indicated at block 420. The work offer may include the address of the home or residence for which the value check is being requested by the customer. The work offer may, but need not, include the name of the customer.

The appraiser selection engine 316 may send the work offer to each of the appraisers whose areas of expertise or experience matched the location of the home for which the value check was requested, as indicated at block 422. Specifically, the appraiser selection engine 316 may access the information in the cells corresponding to the contact information fields 508a-b. To the extent the primary contact information is an email address, e.g., jdoe@email.com, the appraiser selection engine 316 may generate an email message addressed to that email address, and include or attach the work offer to that email. To the extent the primary contact information is a telephone number, the appraiser selection engine 316 may generate an automated voice message that includes the work offer or information on how to access the work offer from the valuation server 106. The communication engine 320 may transmit the work offer to the matching appraisers, e.g., through one or more network messages.

It should be understood that other communication techniques may be used to contact the identified appraisers. For example, the appraiser selection engine 316 may generate one or more text message for transmission by the communication engine 320 to a matching appraiser's telephone number, e.g., mobile number.

The appraisers receiving the work offer may respond to the valuation server 106, as indicated arrow 324. In an embodiment, one or more of the appraisers may return an acceptance, which indicates the respective appraiser's willingness to perform the work offer, as indicated at block 424. In an embodiment, the appraiser selection engine 316 is configured to select one of the appraisers who accepted the work offer, as indicated at block 426. As described herein, the selected appraiser prepares a valuation report of the home identified in the customer order.

It should be understood that, in those cases where multiple appraisers accept the work offer, the appraiser selection engine 316 may employ or implement various techniques for selecting one appraiser to perform a valuation of the home. For example, the appraiser selection engine 316 may be configured to select the first appraiser whose acceptance is received at the valuation server 106. Alternatively, the appraiser selection engine 316 may be configured to transmit the work offer to the matching appraisers in a predetermined sequence or order. For example, the work offer may be sent first to the matching appraiser with the highest years of experience. The appraiser selection engine 316 may then wait some period of time, and transmit the work offer to the matching appraiser with the next highest years of experience, and so on. As soon as an acceptance is received, this process may terminate. It should be understood that other criteria, besides years of experience, may be used, such as highest ratings from customers, best average turn-around time, etc.

The appraiser selection engine 316 may issue a work order to the selected appraiser, as indicated at block 428. Specifically, the appraiser selection engine 316 may generate a work order that includes information from the customer order, including the attached files identified in field 630 (FIG. 6) and uploaded to the valuation server 106, and the customer's comments as entered into text box 632 and also uploaded to the valuation server 106. The communication engine 320 may transmit the work order to the selected appraiser, e.g., through one or more network messages.

The selected appraiser proceeds to determine the value of the home. In an embodiment, the appraiser does not conduct an inspection of the interior or exterior of the home. The appraiser may, but need not, drive by the home. In most cases, the appraiser will be familiar with at least the neighborhood in which the home is located, if not the home itself, based on the appraiser's prior experience in the area in which the home is located. The appraiser will typically search the Multiple Listing Service (MLS) for the home to obtain any prior or current listings of the home, and review the information contained therein. In addition, the appraiser will typically search the MLS for currently active listings as well as closed listings, e.g., completed sales, of homes that, based on the appraiser's experience, are suitable for comparison to the subject home. The appraiser will also typically search other, e.g., non-broker based sources of real estate information, such as information from The Warren Group's web portal, www.thewarrengroup.com and its publication, Banker & Tradesman, to obtain information on private real estate transactions. The appraiser will also conduct a search of the local registry of deeds, which often provide information through on-line websites, to obtain sales and other information on the subject home 102 (FIG. 1), as well as on homes deemed by the appraiser to be comparable. The appraiser will also typically pull the deed for the home, which will provide information on the lot size and dimensions, and list or identify any restrictions, covenants or easements that may affect the property. In many cases, deed information, such as a field card or property card, is available through on-line sources. In this way, the appraiser can obtain the room count, number of bedrooms, bathrooms, etc., whether the home includes an in-law apartment, the age and condition of the home, photographs, etc. The appraiser will also consider information from on-line mapping sources, such as Google and Yahoo Maps. The appraiser may also consult other appraisals or valuation reports that he or she conducted (or to which the appraiser has access) on homes in the immediate area of the home 102, and within a reasonable period of time.

The appraiser also considers the files, if any, that were attached to the customer's order, such as architectural or floor plans, photos of the interior or exterior of the home, videos of walkthroughs, receipts for new windows or other home improvements, etc. The appraiser also reviews the comments added by the customer to the order.

The appraiser uses his or her professional judgment to determine a value of the home. Because the appraiser is familiar with and knowledgeable of the area in which the home is located, the appraiser will consider factors such as, whether the home is on a busy street or a quiet cul-de-sac, whether the home is near sources of noise, whether the home is waterfront property or has water views, whether the home is one of the larger or smaller homes in that neighborhood or area, whether the home has any external obsolescence (such as having a bus station next door), whether the home has any functional obsolescence (such as a bedroom that is only accessible through another bedroom), etc.

The appraiser will also research those homes that have been deemed by the appraiser to be comparable to the subject home. In particular, closed transactions, i.e., actual sales, are typically given the greatest weight, as compared to open listings, e.g., those that may be under agreement. In identifying comparable homes, the appraiser may consider the gross living area (GLA) of the subject home and the comparable homes, the condition, room count, lot size, finished or unfinished basements, the age, the existence and size of garages and other structures, the existence of pools, decks, patios, tennis courts, etc., and the date of sale of the comparable properties. Nonetheless, unlike a full appraisal, which typically requires at least three comparable properties, there may not be any minimum requirement on the number of comparable properties that must be considered in order to support a ValueCheck appraisal.

In this manner, the appraiser reaches an opinion of value based on the information studied, and the appraiser's professional judgment.

Figure 7:
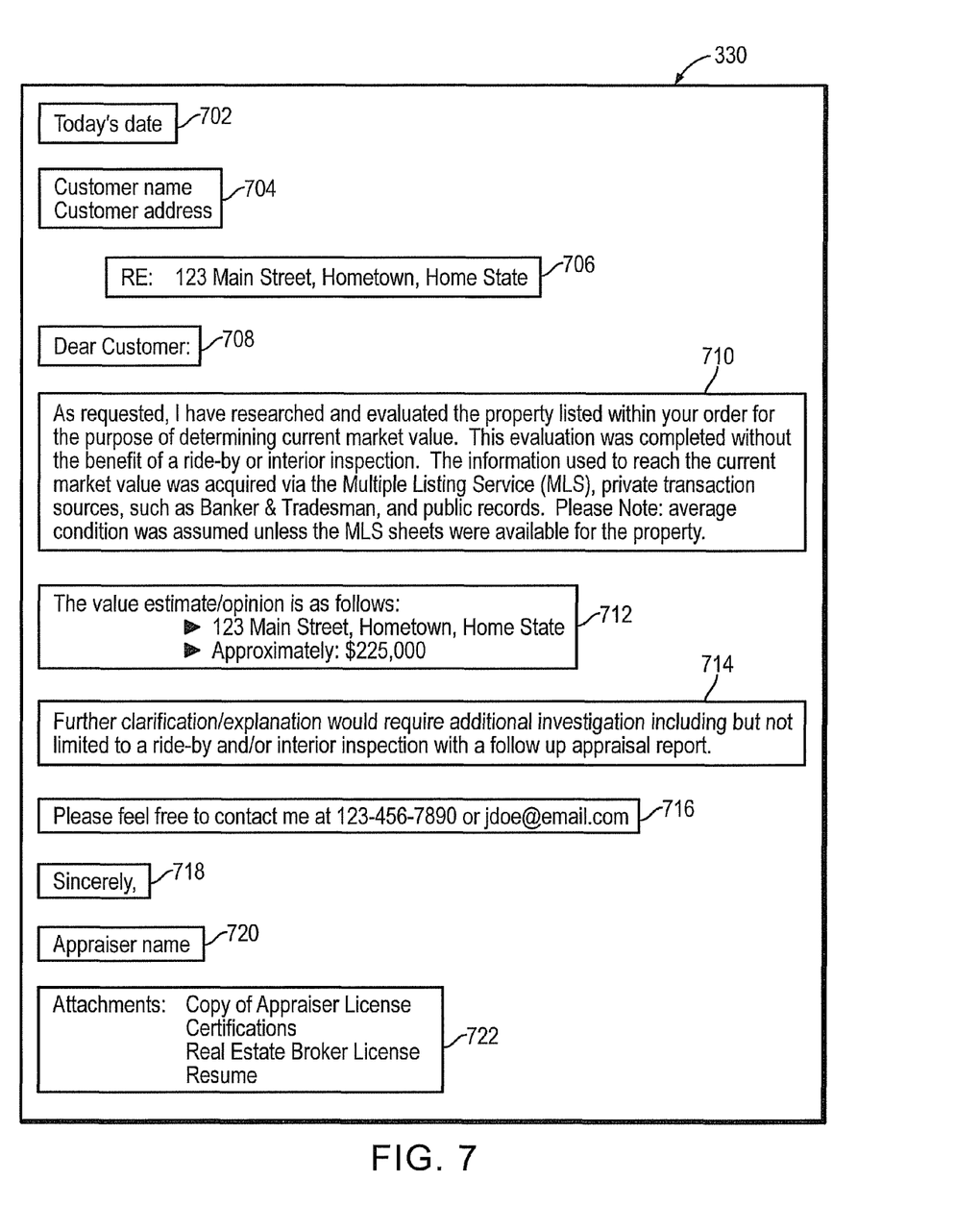
FIG. 7 is a schematic illustration of a valuation report.

The appraiser may generate a ValueCheck appraisal or valuation report, as indicated at block 430 (FIG. 4B). FIG. 7 is a schematic illustration of a valuation report 330 generated by the selected appraiser in accordance with an embodiment of the invention. The valuation report 330 may be organized in the form of a letter. The report 330 may include a date 702, which may contain the date of the valuation report 330, a recipient's name and address area 704, which may contain the name and address of the customer who ordered the valuation report, a subject, e.g., "RE:", line 706, which may include the address of the property for which the valuation report 330 was generated, and a salutation 708. The valuation report 330 may further include a body area having an introductory statement 710. The introductory statement 710 may include an overview of the information or materials considered by the appraiser in reaching the valuation, as well as a description of the limitations on the valuation report, e.g., information that was not used in reaching the valuation, but that might otherwise have been considered if a full appraisal were being performed. The introductory statement 710 also may confirm that the appraiser considered the files and comments attached to the order by the customer, or an explanation as to why such information was not considered. The body area also may include a value statement 712. The value statement 712 contains the dollar value, e.g., $225,000, that the appraiser reached for the property. The body area may include a closing statement 714 and a contact statement 716 should the customer wish to contact the appraiser directly. To the extent certain factors influenced the value to a significant degree, they may be identified in the closing statement 714 or elsewhere in the report 330.

The valuation report 330 may include a closing or valediction 718 and a signature block 720. The appraiser enters his or her signature in the signature block 720. That is, in an embodiment, the valuation report 330 is signed by the appraiser that created it. In an embodiment, the valuation report 300 further includes one or more attachments, as indicated by a listing of attachments 722. Specifically, the appraiser may include a copy of his appraiser license, thereby confirming to the customer that the appraiser is a licensed appraiser in the area in which the home is located. As the license will also typically include an expiration date, the customer can confirm that the appraiser is currently licensed. The appraiser may also include one or more certificates, such as a certificate from an appraiser association or standards or certifying body. To the extent the appraiser is also a licensed broker, the appraiser may include a copy of his or her broker's license. A copy of the appraiser's resume may also be included with the valuation report 330. In this way, the identity, credentials, and experience of the appraiser providing the valuation report is made clear to the customer.

It should be understood that the valuation report 330 may include additional or other information. For example, photographs of the home obtained from the MLS, a description of the comparable properties, etc. may be included in the report 330. Nonetheless, it should be understood that the valuation report 330 is not of the form of a full appraisal. That is, the ValueCheck appraisal or valuation report will typically not include interior photos, a floor plan of the home, maps or charts, identification or descriptions of the comparable properties, etc.

It should also be understood that the valuation report may take other forms, such as a Memorandum, etc.

In an embodiment, the valuation report may be transmitted from the selected appraiser to the valuation server 106, as indicated at block 432 (FIG. 4B). Specifically, the selected appraiser may transmit the valuation report from an appraiser-client, such as laptop computer 114, via the communications network 108, to the valuation server 106, e.g., as part of one or more network messages. The value check access engine 318 may receive the valuation report 330, and store it in the value check database 304, as indicated at block 434 (FIG. 4C). The value check access engine 318 also may notify the customer that the valuation report that he or she ordered is now available, as indicated at block 436. For example, the value check access engine 318 may transmit a message, such as one or more email, text or automated voice messages, to the customer client. The message may include a link to the valuation report 330 as well as security information, such as a password, which may be utilized by the customer in order to access the valuation report 330 stored at the value check database 304. Utilizing the received link and security information, the customer-client may access, e.g., download, the valuation report 330 from the value check database 304, as indicated at block 438.

It should be understood that the valuation report 330 may be provided, or made available, to the customer in other ways. For example, the selected appraiser may send the valuation report 330 directly to the customer-client from the appraiser-client. In this embodiment, the valuation report 330 may, but need not, also be copied to and stored at the valuation server 106. In another embodiment, the valuation server 106 may transmit a copy of the valuation report 330 to the customer rather than, or in addition to, providing the customer with a link to access the report as stored on the valuation database 304. The customer may select the mode of delivery and may specify when the valuation report is to be completed as part of the order process. Those skilled in the art will understand that other methods or techniques may be used.

It should be further understood that a quality check may be performed on the valuation report 330 before it is provided to the customer. For example, the valuation report 330 may be checked by an experienced appraiser to ensure that the valuation report 330 meets one or more quality standards. Additionally, a request may be made to review the "work file" created by the appraiser in generating the ValueCheck appraisal. The work file will typically include the appraiser's notes and information on the comparable properties that were considered in reaching the opinion of value.

In an embodiment, upon receiving the valuation report 330, the valuation server may remit payment to the selected appraiser, as indicated at block 440. For example, the order acceptance engine 314 may be configured to apply a credit to a credit or debit card account of the appraiser. Alternatively, a check may be generated and sent to the appraiser. The appraiser may be paid a portion of the amount charged to the customer at the payment processing step 414 (FIG. 4A) described above. For example, the appraiser may be paid 90%, or all but $5.00, of the amount charged to the customer. Those skilled in the art will understand that the appraiser may be compensated for his or her work in other ways.

As indicated above, the customer may provide feedback regarding the appraiser's work. For example, the customer, through the customer-client, may provide feedback to the valuation server 106 regarding the timeliness and quality of the selected appraiser's work. This feedback may be stored at the appraiser database 302 with the record 328 associated with that appraiser. Appraisers who continuously receive poor feedback may be removed from the appraiser database 302.

The foregoing description has been directed to specific embodiments of the present invention. It will be apparent, however, that other variations and modifications may be made to the described embodiments, with the attainment of some or all of their advantages. For example, the appraiser and valuation databases may be merged into a single database. The web hosting functionality may be provided on one or more machines separate from the one or more machines storing the databases. Therefore, it is the object of the appended claims to cover all such variations and modifications as come within the true spirit and scope of the invention.

What is claimed is:

1. A method comprising:

generating at a customer-client an order for a value determination of a residence;

appending at least one file to the order, the at least file including customer selected information regarding the residence;

storing, in a database accessible by a server, a plurality of appraiser records, wherein each appraiser record corresponds to a licensed appraiser and includes one or more location fields and one or more contact fields;

receiving at a network interface card of the server the order for the value determination of the residence, wherein the order identifies an address of the residence;

matching the address of the residence with data in the one or more location fields of at least one appraiser record;

identifying the at least one appraiser record whose one or more location fields matches the address of the residence;

extracting data from the one or more contact fields of the at least one appraiser record whose one or more location fields matches the address of the residence;

transmitting by the network interface card of the server a request message utilizing the extracted data from the one or more contact fields, the transmitted request message including the address of the residence and the at least one file;

receiving at an appraiser-client the request message transmitted by the network interface card of the server;

presenting at least part of the received request message at the appraiser-client;

remotely generating, by the licensed appraiser corresponding to the at least one appraiser record, a valuation report of the residence without any visit or inspection of the residence, the valuation report including a value estimate of the residence that takes into account the selected information included in the at least one file; and transmitting the valuation report from the appraiser-client to the server.

2. The method of claim 1 further comprising:

securely storing the valuation report at the server; and granting access to the stored valuation report to a customer-client.

3. The method of claim 1 wherein the valuation report:

is signed by the at least one licensed appraiser, and includes license or certification information of the at least one licensed appraiser.

4. The method of claim 1 wherein the at least one file is one of an image file, a video file and a text-based file.

5. The method of claim 1 wherein the at least one file is an architectural or a floor plan.

6. The method of claim 1 further comprising transmitting by the network interface card of the server the at least one file to the appraiser-client.

7. The method of claim 1 wherein the one or more location fields include one or more zip codes.

8. The method of claim 7 wherein the address of the residence to be appraised includes a zip code.

* * * * *